2,795,177

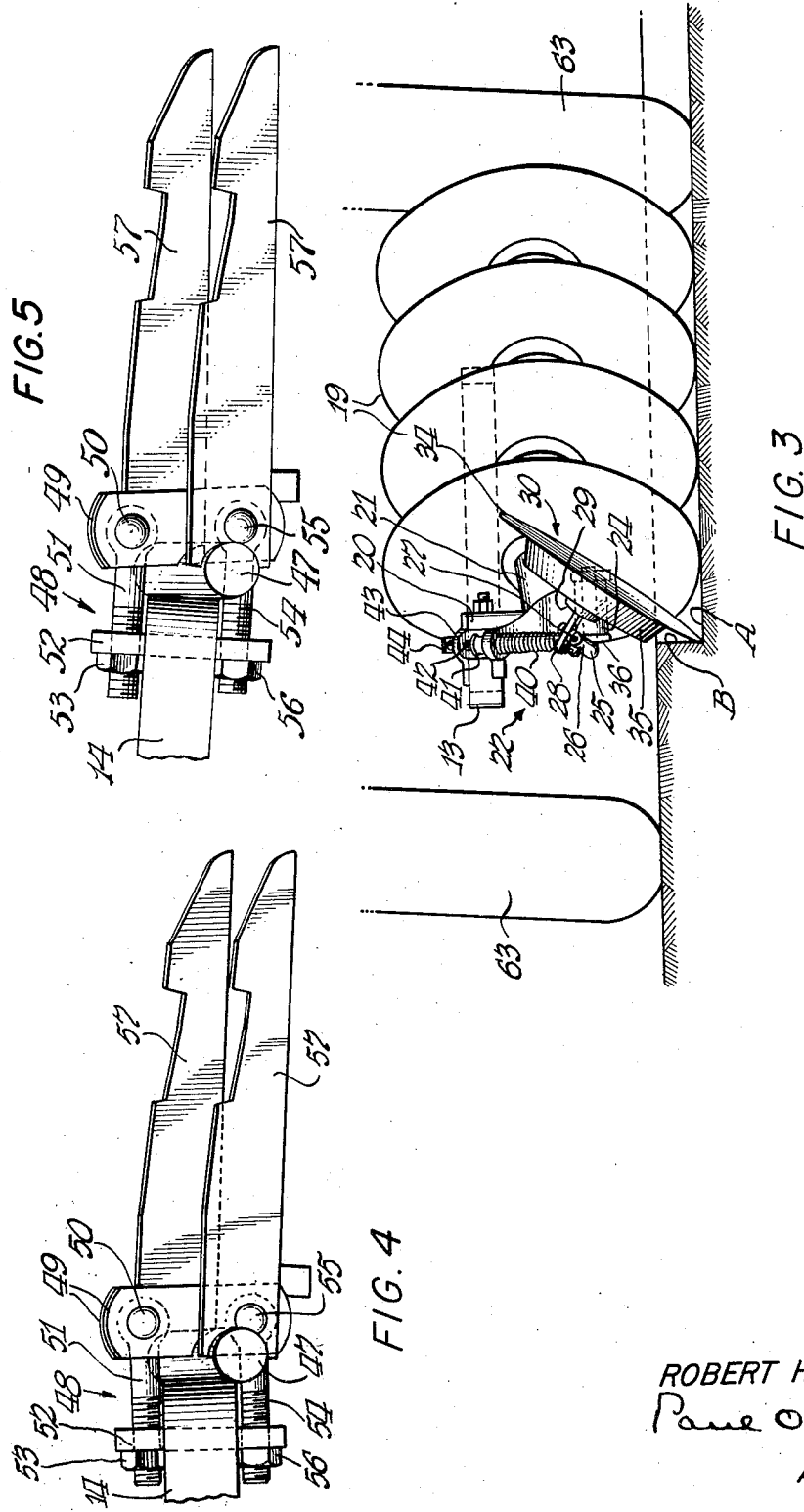

TRACTOR PROPELLED IMPLEMENT

Robert H. Miller, Memphis, Tenn., assignor to International Harvester Company, a corporation of New Jersey Application June 9, 1953, Serial No. 360,410

2 Claims. (Cl. 97—47.24)

This invention relates to agricultural implements and particularly to an implement of the class of disk or harrow plows adapted to be mounted upon a tractor to be transported thereby, and having at the rear end of the implement a ground-engaging furrow wheel adapted to offset the effects of side thrust on the plow.

An implement of the harrow plow type is generally mounted at the rear of a tractor and comprises a relatively elongated frame having a tool supporting structure forming a part thereof extending diagonally to the direction of travel. The earth working tools are a series of disks mounted upon an axis diagonal to the path of travel and adapted to open a furrow in the ground to selected depths. Lateral forces acting against an implement of this type necessitate the use of a rear furrow wheel or the like arranged to engage the furrow wall made by the disks to hold the implement in line. When obstructions or other abnormal conditions are encountered during operation, the tendency of the implement is to rise out of the ground to clear the obstruction, and side thrust swings the implement away from the furrow. The principal object of the present invention is to provide an improved agricultural implement of the disk or harrow plow type and improved means for mounting it upon a tractor.

Another object of the invention is the provision of an improved agricultural implement such as a disk or harrow plow including improved means for connecting the implement to a tractor, and for controlling the depth of operation thereof.

A further object of the invention is the provision of an improved furrow-forming implement having incorporated therein improved means for maintaining uniform operation thereof.

Another object of the invention is the provision in an agricultural implement of the type having lateral forces acting thereagainst in operation of improved means for offsetting the effects of these lateral forces and maintaining the normal operating position of the implement.

Other objects and advantages of the invention will become clear from the following detailed description when read in conjunction with the accompanying drawings, wherein:

Figure 3 is a view in rear elevation of a portion of the structure shown in Figures 1 and 2, illustrating the mounting of the rear furrow wheel with respect to the gang of disks;

Figure 4 is an enlarged detail of a portion of the hitch mechanism of the implement;

Figure 5 is a view similar to Figure 4 showing an altered relationship of the parts when an adjustment has been made for change in operating depth; and Figure 6 is a front elevation, on a smaller scale, of a portion of the structure shown in Figure 4.

Figure 1:
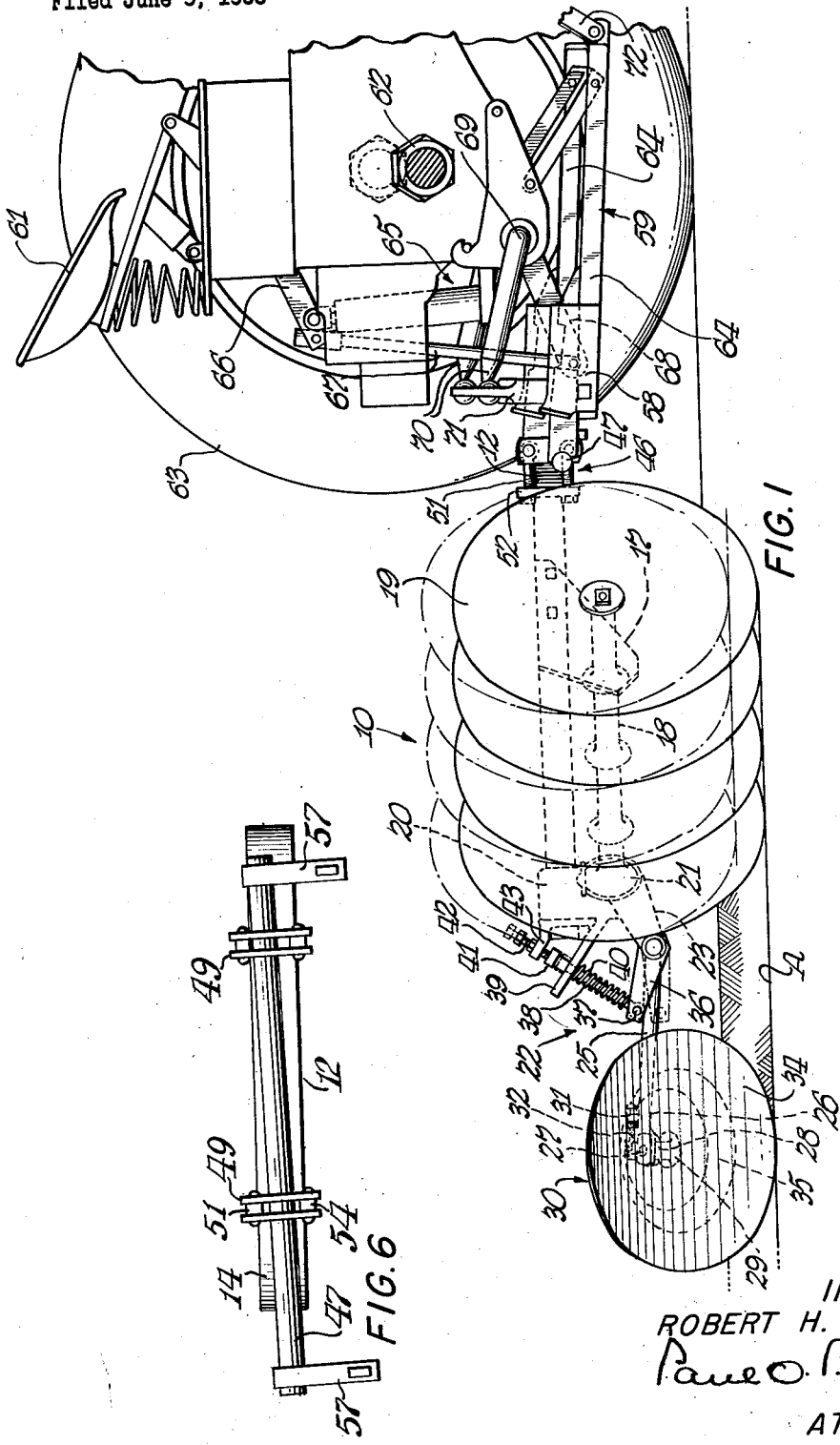
Figure 1 is a view in side elevation of the rear end of a tractor having mounted thereupon an agricultural implement incorporating the features of this invention.
Figure 2:
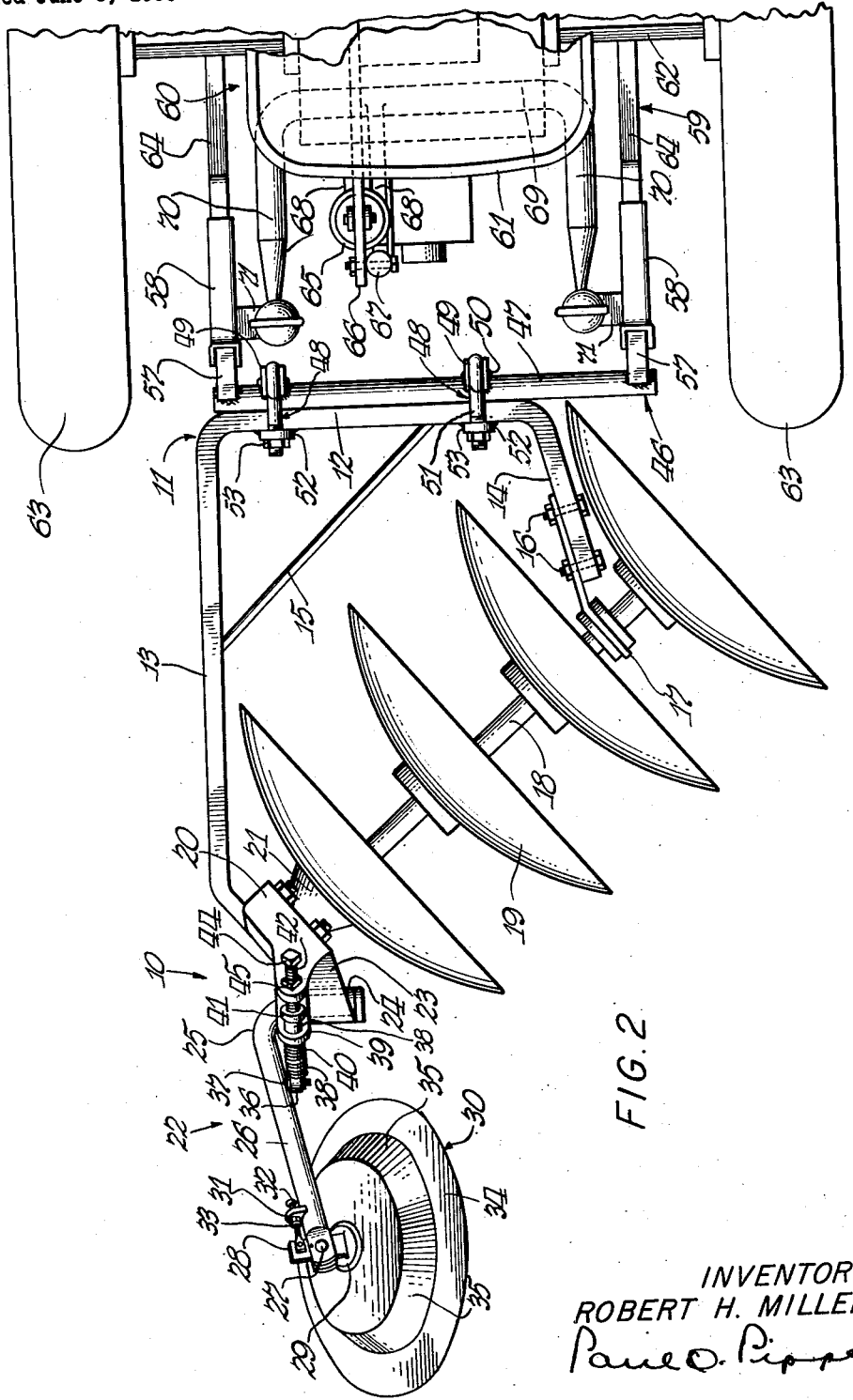
Figure 2 is a plan view of the structure shown in Figure 1.

Referring to the drawings, the implement described herein is a harrow plow, designated by the numeral 10, which comprises a frame 11 having a transverse front portion 12, a longitudinally extending elongated part 13 at right angles to the part 12 and a right hand shortened bar portion 14 extending rearwardly laterally spaced from the bar 13. The frame 11 is braced by a bar 15. The frame 11 is generally U-shaped, and the bars 13 and 14 form the rearwardly extending arms thereof.

The rear end of the arm 14 has secured thereto by bolts 16 a strap 17 to which is secured the forward end of a diagonally extending disk-supporting shaft structure 18 having mounted thereupon at spaced locations a plurality of earth penetrating disks 19. The rear end of the arm 13 has mounted thereupon a hanger 20 having a bearing portion 21 integral therewith for supporting the rear end of the diagonally extending supporting structure 18 for the disks.

The hanger 20 likewise supports a rear furrow wheel assembly generally designated at 22. The hanger 20 is provided with a rearwardly and downwardly extending arm portion 23 having at its lower end a bearing 24 in which is pivotally mounted the transverse portion of a wheel carrier in the form of an axle 25 having a longitudinally extending part 26 bifurcated at its rear end and carrying a generally vertically extending pivot pin 27 mounted in a lug 28 affixed to the hub 29 of a rear furrow wheel 30. Also mounted upon the rear end of the axle 25 is a lug 31 having a threaded aperture therein to receive one end of a bolt 32, the other end of which is pivotally mounted on the lug 28. A nut 33 is provided on the bolt 32 so that by adjusting the position of the bolt 32 relative to the lug 31 the lead of the wheel 30 may be adjusted and held in its adjusted position. The wheel 30 comprises a thin sharpened peripheral ring 34 and a conically shaped, relatively wide gauging portion 35, the peripheral portion 34 being adapted to penetrate the ground at the bottom of a furrow designated at A in Figures 1 and 3, and to bear against the furrow wall designated at B made by the disks 19. The broadened gauge portion 35 of the furrow wheel 30 is adapted to limit the penetration of the disks into the earth. The broadened gauging part 35 of the furrow wheel is preferably weighted to assist it in holding its position in the furrow.

A rearwardly extending arm 36 is affixed to the transverse portion of the axle 25, and is provided at its end with a pin 37 to which is connected the lower end of a rod 38, the upper end of which is slidably received in an aperture provided in a bracket 39 affixed to the housing 20 and projecting rearwardly and upwardly therefrom. A spring 40 surrounds the rod 38 between the arm 36 and the bracket 39. Spring 40 is a compression spring and, being in engagement with the stationary bracket 39, urges the furrow wheel assembly downwardly relative to the disks 19. The upper end of the rod 38 is provided with a head 41 which is engageable with the lower end of a threaded bolt 42 receivable in a threaded opening provided in a lug 43, also affixed to and extending rearwardly from the hanger 20. The bolt 42 is provided with a head 44 for adjusting the bolt in the lug 43, and is also provided with a nut 45 engageable with the lug for securing the bolt in an adjusted position.

At the front end of the frame member 11 is provided a hitch member 46 including a transverse cylindrical bar 47 parallel to the transverse portion 12 of the frame and secured thereto by spaced clamps 48. Each of the clamps 48 comprises an upright member 49 welded to the hitch bar 47 and including spaced plates carrying a pivot pin 50 upon which is mounted an eyebolt 51 which is threaded for reception in an opening provided in the upper end of a clamping element 52 against the rear face of the frame part 12. A nut 53 is provided at the end of the upper bolt 51, and a lower eyebolt 54 is pivotally mounted upon a pin 55 carried at the lower end of the bracket 49. The threaded end of the bolt 54 is received in an opening in the lower part of the element 52 and another nut 56 is provided on the end thereof.

Laterally spaced shaft members 57 are provided and affixed at their rear ends to the hitch bar 47. These shaft members 57 are slidably receivable in sockets 58, laterally spaced and mounted at the ends of a U-shaped drawbar 59 pivotally connected at its forward end to the tractor 60 in a manner, not shown, providing for lateral and vertical swinging of the implement relative to the tractor. The tractor is a conventional type provided with an operator's station 61, a transverse rear axle structure 62 and rear drive wheels 63. The drawbar 59 forms a part of a tractor attaching structure for implements which is described in detail in copending U. S. application, Serial No. 338,651 filed February 25, 1953.

The socket members 58 at the rear ends of rearwardly extending arms 64 of the drawbar 59 are provided with suitable latching mechanism, not shown but also described in the application above mentioned, for holding the shaft members 57 in the respective laterally spaced sockets. Vertical movement of the implement between operating and transport positions relative to the tractor is accomplished by the provision of a ram unit 65 mounted upon the tractor and connected to an arm 66 pivotally mounted on the tractor, which, in turn, is connected by a lift rod 67 with a rock arm 68 affixed to and extending rearwardly from a rock shaft 69 having laterally spaced lift arms 70 thereon connected by links 71 with the arms 64 of the drawbar.

Vertical movement of the front end of the drawbar 59 for varying the operating depth of the implement is accomplished by the connection of a lift rod 72 to the front end of the drawbar 59. This lift rod 72 is suitably connected, in a manner not shown, to power actuated mechanism on the tractor for vertically moving the rod 72 and the front end of the drawbar. This raises or lowers the front end of the implement to allow the plow to find its operating depth.

Further adjustment of the implement relative to the tractor affecting its depth of operation is desirable, for example, when the size of the disks 19 is to be varied. By loosening nut 56 on each of the lower bolts 54 and tightening nut 53 on each upper bolt 51 the relationship between the shafts 57 and the plow frame 11 will be altered from a position such as that shown in Figure 4 to that of Figure 5. The lateral angular relationship of shaft 47 to the transverse portion 12 of the plow frame is illustrated in Figure 6, this relationship being due to the fact that the plow frame is maintained substantially level during operation while one of the tractor wheels rides lower than the other. Thus, while both shafts 57 are visible in Figures 1, 4 and 5, because of the angle assumed by shaft 47, only one bolt 51 is visible.

It has previously been pointed out that an implement of this type is subjected to considerable lateral thrust in operation. The rear furrow wheel 30 functions as a gauge and furrow wheel and is provided to assist in maintaining the implement in operating position to assure uniform operation thereof under all conditions. Upon encountering an obstruction or abnormal conditions in operation, the disks 19 tend to rise upwardly, for example, from the solid line position shown in Figure 1 to the dotted line position shown. Were it not for the furrow wheel assembly 22, the disks would rise above the wall B of the furrow formed thereby and swing to the left across the surface of the ground. The same would be true with the conventional type of furrow wheel assembly usually provided since the latter would rise with the disks. In the furrow wheel assembly of this invention, however, applicant has provided means for offsetting this tendency. When abnormal plowing conditions are encountered and the disks 19 tend to rise out of the ground, the furrow wheel 30 is urged in the opposite direction, that is, downwardly, by the action of the compression spring 40. In the solid line position of Figure 1 the parts are in their normal operating position. However, when the disks move to the dotted line position the bolt 42 likewise moves to the dotted line position indicated and the lower end thereof is separated from the head 41 of the rod 38. By being urged always downwardly into the furrow, the furrow wheel 30 always maintains its engagement with the furrow wall B and offsets the lateral forces acting upon the plow. Thus, when the disks 19 move upwardly they are still maintained in their plowing position, vertically, and return directly to that position when the obstruction is passed. In the normal operation of the implement, the head 41 of the rod 38 is maintained in engagement with the lower end of the bolt 42 so that the wheel 30 cannot move upwardly relative to the implement, but will maintain the operating depth selected therefor. The furrow wheel can only move downwardly from a selected position relative to the disks, selected by actuation of the bolt 42 to vary the operating position of the furrow wheel relative to the disks, its setting being synchronized with the adjustment made in the front end of the plow by raising or lowering the front of the drawbar 59. It will be noted particularly well in Figure 3 that the wheel 30 is set not only at an angle to the vertical but likewise at an angle to a horizontal center line paralleling the path of travel. This feature promotes the aggresive action of the wheel in the furrow to offset the side thrust on the plow. Furthermore, the angle of lead of the wheel may be adjusted by manipulation of the bolt 32 to selected positions.

The operation of the agricultural implement of this invention should be clearly understood from the foregoing description. It should likewise be understood, however, that modifications may be made in the invention without departing from the spirit thereof or the scope of the appended claims.

What is claimed is:

1. A rear furrow wheel assembly for a disk plow pivotally connected at its front end to a tractor for lateral and vertical swinging about said pivotal connection, comprising a support, a rearwardly extending arm pivotally mounted on the support at its rear end for vertical swinging and having a furrow wheel mounted thereon arranged to travel in the furrow made by the furrow-forming tools, means serving as a stop on the support, means on said wheel arm engageable with said stop in the normal operating position of the plow to prevent upward movement of the wheel relative to the support, said wheel arm being swingable downwardly relative to the support away from said stop upon upward swinging of the plow about the pivotal connection of its front end to the tractor, and slide and guide means connecting the wheel arm to the support at a location spaced from its pivotal connection thereto including a member slidable relative to the support carried by the wheel arm and engageable with said stop in the normal operating position of the wheel relative to the furrow-forming tools.

2. A rear furrow wheel assembly for a disk plow pivotally connected at its front end to a tractor for lateral and vertical swinging about said pivotal connection, comprising a support, a rearwardly extending arm pivotally mounted on the support at its rear end for vertical swinging and having a furrow wheel mounted thereon arranged to travel in the furrow made by the furrow-forming tools, means serving as a stop on the support, means on said wheel arm engageable with said stop in the normal operating position of the plow to prevent upward movement of the wheel relative to the support, said wheel arm being swingable downwardly relative to the support away from said stop upon upward swinging of the plow about the pivotal connection of its front end to the tractor, slide and guide means connecting the wheel arm to the support at a location spaced from its pivotal connection thereto including a member slidable relative to the support carried by the wheel arm and engageable with said stop in the normal operating position of the wheel relative to the furrow-forming tools, and a relatively strong spring on the slidable member reacting against the support and the wheel arm to bias the wheel downwardly and maintain engagement thereof with the bottom of the furrow upon upward movement of the furrow-forming tools in response to excessive draft load on the plow.

References Cited in the file of this patent

UNITED STATES PATENTS

| | | |
|---|---|---|
| 1,397,146 | Ruedy | Nov. 15, 1921 |
| 1,409,219 | Krotz | Mar. 14, 1922 |
| 2,195,515 | Ferguson | Apr. 2, 1940 |
| 2,340,495 | Strandlund | Feb. 1, 1944 |
| 2,662,460 | Klemm et al. | Dec. 15, 1953 |
| 2,691,931 | Wilson | Oct. 19, 1954 |

FOREIGN PATENTS

| | | |
|---|---|---|
| 980,890 | France | Jan. 3, 1951 |